(12) United States Patent
Berkcan et al.

(10) Patent No.: US 9,170,136 B2
(45) Date of Patent: Oct. 27, 2015

(54) SYSTEMS AND METHODS FOR FLOW SENSING IN A CONDUIT

(71) Applicant: Amphenol Thermometrics, Inc.

(72) Inventors: Ertugrul Berkcan, Clifton Park, NY (US); Ibrahim I. Kouada, Niskayuna, NY (US); Michael Klitzke, Niskayuna, NY (US); Nannan Chen, Niskayuna, NY (US)

(73) Assignee: Amphenol Thermometrics, Inc., Saint Marys, PA (US)

( * ) Notice: Subject to any disclaimer, the term of this patent is extended or adjusted under 35 U.S.C. 154(b) by 0 days.

(21) Appl. No.: 14/072,393

(22) Filed: Nov. 5, 2013

(65) Prior Publication Data

US 2015/0122049 A1    May 7, 2015

(51) Int. Cl.
| | |
|---|---|
| *G01F 1/00* | (2006.01) |
| *H03M 1/04* | (2006.01) |
| *H02P 23/00* | (2006.01) |
| *G01F 1/32* | (2006.01) |
| *G01K 1/00* | (2006.01) |
| G01F 25/00 | (2006.01) |
| G01F 15/02 | (2006.01) |

(52) U.S. Cl.
CPC ............... *G01F 1/32* (2013.01); *G01F 1/3209* (2013.01); *G01K 1/00* (2013.01); *G01F 15/024* (2013.01); *G01F 25/0007* (2013.01)

(58) Field of Classification Search
CPC ............ G01F 1/00; H03M 1/04; H02P 23/00
USPC .................. 73/861; 341/112, 116; 318/811
See application file for complete search history.

(56) References Cited

U.S. PATENT DOCUMENTS

| | | |
|---|---|---|
| 5,146,414 A | 9/1992 | Mckown et al. |
| 6,023,969 A | 2/2000 | Feller |
| 6,150,681 A | 11/2000 | Allen |
| 6,169,965 B1 | 1/2001 | Kubisiak et al. |
| 7,000,464 B2 | 2/2006 | Mcmillan et al. |
| 7,197,942 B2 | 4/2007 | Gysling et al. |
| 8,165,830 B2 | 4/2012 | Mcanally et al. |
| 8,228,217 B2 * | 7/2012 | Fernando et al. ............. 341/116 |
| 8,364,427 B2 | 1/2013 | Berkcan et al. |
| 8,397,586 B2 | 3/2013 | Sorenson et al. |

(Continued)

OTHER PUBLICATIONS

Shakir et al.,"Flow sensor using micro machined pressure sensor", Sensors, 2008 IEEE,Issue Date—Oct. 26-29, 2008, pp. 62-65, 1930-0395.

*Primary Examiner* — Jewel V Thompson
(74) *Attorney, Agent, or Firm* — Blank Rome LLP

(57) ABSTRACT

Systems and methods for flow sensing in a conduit are provided. One system includes a flow disturber disposed in a flow conduit and configured to impart a flow disturbance to the fluid flow. The system further includes a plurality of flow sensors disposed in the flow conduit and responsive to flow characteristics in the flow conduit. The system also includes a frequency resolver configured to determine frequency information related to the fluid flow based on the flow characteristics. The frequency resolver uses one or more time sample windows to select data samples for use in determining the frequency information, wherein a length of one or more of the time sample windows is based at least in part on the flow characteristics. The system additionally includes a processor configured to determine a flow rate of the fluid flow in the flow conduit using the frequency information.

21 Claims, 5 Drawing Sheets

(56) References Cited

U.S. PATENT DOCUMENTS

| | | |
|---|---|---|
| 2004/0244499 A1 | 12/2004 | Keita et al. |
| 2005/0126281 A1 | 6/2005 | Blakley et al. |
| 2006/0277000 A1 | 12/2006 | Wehrs |
| 2008/0272732 A1* | 11/2008 | Schulz et al. ............ 318/811 |
| 2013/0079667 A1 | 3/2013 | Berkcan et al. |

\* cited by examiner

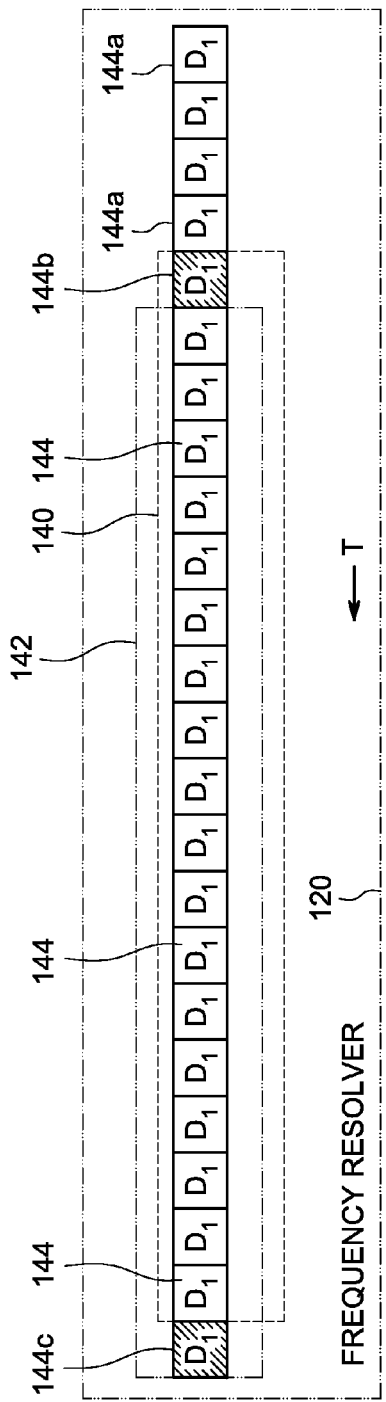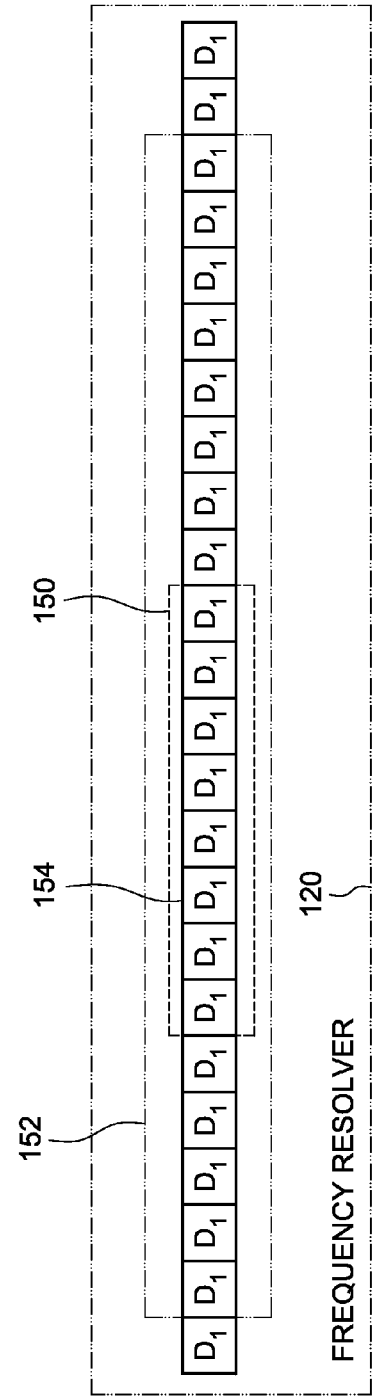

SYSTEMS AND METHODS FOR FLOW SENSING IN A CONDUIT

BACKGROUND

Flow sensing may be used in a variety of different applications, such as to determine flow velocity of a fluid, such as gas (e.g., air) or liquid, through a pipe or tube. For example, flow sensing may be used in ventilation and respiration machines to detect and control the level of air flow. As another example, flow sensing may be used in gas metering systems, such as for residential applications.

The determination of the fluid flow may be affected by many different factors, such as temperature, moisture variations, or the type or density of fluid, among others. Some conventional systems are not satisfactorily responsive to these different factors. As a result, the outputs of these systems may drift and cause readings that are not accurate. Additionally, the robustness of these systems suffer.

In a medical setting, when using ventilation and respiration machines such as continuous positive airway pressure (CPAP) machine and a variable positive airway pressure (VPAP) machine, it is important to be able to determine accurately the flow rate of ventilation and/or respiration. For example, the air supply pressure from these machines is varied based on whether the person is breathing in or out, such as during inspiration and expiration phases of the respiratory system. By properly controlling the air flow during different phases of breathing, a more comfortable process results. The more comfortable the ventilation and/or respiratory machine is to a person during use, the more likely the person is to continue to use the ventilation and/or respiratory machine. Users of ventilation and/or respiratory machines may unilaterally decide to cease use of the machine as a result of the machine being uncomfortable during operation, such as when an appropriate air pressure is not supplied. However, due to the complex nature of breathing and the change in direction and speed of air flow during breathing (as well as other factors), it is very difficult to determine flow rates.

BRIEF DESCRIPTION

In accordance with various embodiments, a flow sensor assembly is provided that includes a flow conduit configured to allow fluid flow therethrough and a flow disturber disposed in the flow conduit, wherein the flow disturber is configured to impart a flow disturbance to the fluid flow. The flow sensor assembly further includes a plurality of flow sensors disposed in the flow conduit, wherein the plurality of flow sensors is responsive to flow characteristics in the flow conduit. The flow sensor assembly also includes a frequency resolver coupled to the plurality of flow sensors, wherein the frequency resolver is configured to determine frequency information related to the fluid flow based on the flow characteristics. The frequency resolver uses one or more time sample windows to select data samples from the plurality of flow sensors for use in determining the frequency information, wherein a length of one or more of the time sample windows is based at least in part on the flow characteristics. The flow sensor assembly additionally includes a processor coupled to the plurality of flows sensors and the frequency resolver, wherein the processor is configured to determine a flow rate of the fluid flow in the flow conduit using the frequency information.

In accordance with other various embodiments, a method for determining flow rate in a conduit is provided. The method includes positioning within a flow conduit a flow disturber configured to impart a flow disturbance to the fluid flow and disposing a plurality of flow sensors in the flow conduit, wherein the plurality of flow sensors are responsive to flow characteristics in the flow conduit. The method also includes coupling at least one frequency resolver to the plurality of flow sensors, wherein the frequency resolver uses one or more time sample windows to select data samples from the plurality of flow sensors for use in determining frequency information. Additionally, a length of one or more time sample windows is based at least in part on the flow characteristics. The method further includes coupling a processor to the plurality of flows sensors and the frequency resolver, wherein the processor is configured to determine a flow rate of the fluid flow in the flow conduit using the frequency information.

In accordance with other various embodiments, a method for determining flow rate in a conduit is provided. The method includes acquiring measurements from a plurality of flow sensors in a flow conduit having disturbances imparted therein, wherein the measurements correspond to flow characteristic information. The method also includes determining frequency information from the measurements within one or more time sample windows, wherein the one or more time sample windows define a plurality of data samples from the plurality of flow sensors for use in determining the frequency information. Additionally, a length of one or more time sample windows is based at least in part on the flow characteristics. The method further includes determining a flow rate of the fluid flow in the flow conduit using the determined frequency information.

BRIEF DESCRIPTION OF THE DRAWINGS

FIG. 4 is a schematic illustration of a frequency resolver in accordance with an embodiment.

FIG. 5 is a schematic illustration of a frequency resolver in accordance with another embodiment.

DETAILED DESCRIPTION

The following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Although the various embodiments may be described herein within a particular operating environment, it should be appreciated that one or more embodiments are equally applicable for use with other configurations and systems. Thus, for example, the various embodiments may be used in connection with a ventilation and/or respiratory machine, as well as in different medical and non-medical applications.

Various embodiments provide systems and methods for flow sensing or detection using one or more flow sensors. For example, various embodiments use flow sensors to provide volumetric flow sensing. In some embodiments, a plurality of sensors are used for time based sensing and optimization for fast time response volumetric flow sensing. The flow rate determination may be used, for example, in ventilation and/or respiratory machines, such as continuous positive airway pressure (CPAP) machines and variable positive airway pressure (VPAP) machines. However, various embodiments may be used in other systems and applications, for example, natural (or other) gas metering applications, residential gas metering applications, etc.

At least one technical effect of various embodiments is increased accuracy of flow sensing without drift and with a higher degree of robustness with respect to fluid density, mixture, temperature, and/or moisture variations. At least one technical effect of various embodiments is a more robust lower cost flow sensor. At least one technical effect of various embodiments is a simpler package design for a flow sensor with reduced constraints on design parameters.

Figure 1:
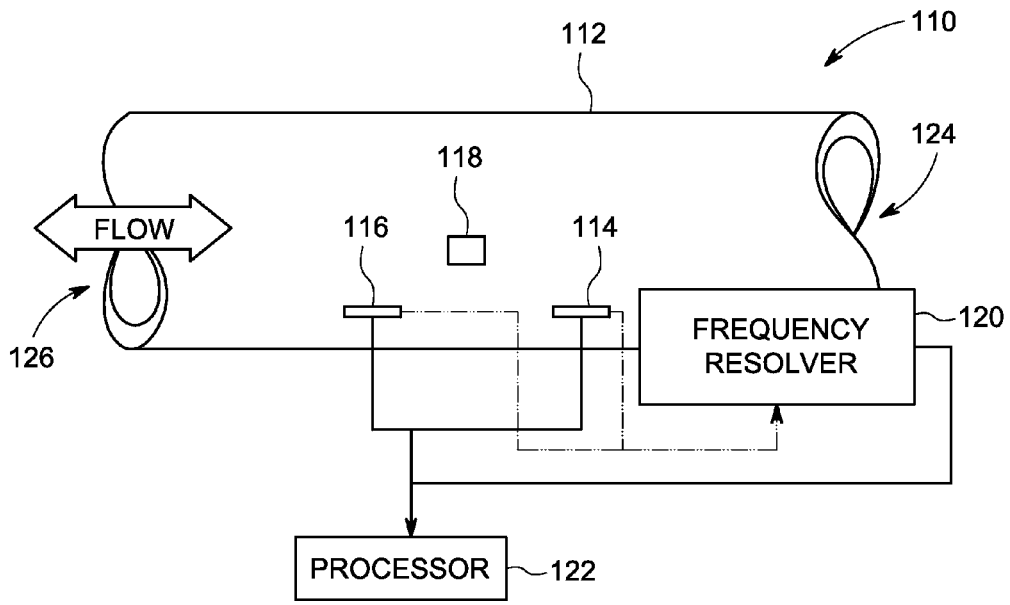
FIG. 1 is a schematic illustration of a flow sensor assembly in accordance an embodiment.

FIG. 1 illustrates schematically a flow sensor assembly 110 in accordance with an embodiment that may be used, for example, with a CPAP or VPAP machine to determine and control the flow of air to a user, such as to provide varying levels of positive airway pressure to a user when sleeping. However, as described herein, the flow sensor assembly 110 may be used in other applications. The flow sensor assembly 110 may be used to provide improved or optimized characterization and sensing of timing characteristics of volumetric flow sensing to obtain faster response flow measurements.

In general, the flow sensor assembly 110 includes a plurality of sensors, illustrated as the sensors 114 and 116 (which in various embodiments are flow sensors) that are disposed within a flow conduit 112 and are responsive to flow characteristics in the flow conduit. In some embodiments, the sensors 114, 116 are configured (e.g., positioned within the flow conduit 112 and with respect to each other) to have a geometrical and functional relationship with the flow conduit 112 and one or more flow disturbers 118 (or flow disrupter), where one flow disturber 118 is shown in the illustrated embodiment. For example, the sensors 114, 116 are responsive to flow characteristics within the flow conduit 112 as described in more detail herein. At least one additional sensor (not shown), such as a thermistor or thermopile device, which in various embodiments is a temperature sensor, may also be disposed within the flow conduit 112 and configured (e.g., positioned within the flow conduit 112 and with respect to each other) to have a geometrical and functional relationship with the sensors 114, 116. In various embodiments, the additional sensor may be responsive to different characteristics, such as temperature characteristics in vicinity or proximity to the sensors 114, 116.

The sensors 114, 116 in various embodiments are configured to generate signals characteristic of disturbances within the flow conduit 112. For example, the disturbances may include a disturbance of the fluid flow, pressure fluctuations in a flow conduit 112, acoustic waves (e.g., audible sound waves or ultrasonic acoustic waves), and acoustic energy, among others. Accordingly, a disruption in a fluid flow creates certain characteristics, which may include vortices or pressure/flow pulses that can be sensed and analyzed. In particular, fluid flow will have a certain direction, velocity, pressure, and temperature associated therewith. By placing a disruption in the fluid stream (such as using the flow disturber 118), the velocity is altered, as are the pressure and/or temperature. These changes can be detected and analyzed to determine a flow rate of the fluid flow in the flow conduit 112, for example, using one or more frequency resolvers 120 (one is illustrated in FIG. 1). The frequency resolver 120 may implement, for example, one or more fast Fourier transform (FFT) methods or schemes to process raw waveform data output from the sensors 114, 116 to determine frequency information for the detected flow within the flow conduit 112. The determined frequency information then may be used to determine a flow rate of the fluid flow in the flow conduit 112 as described in more detail herein.

For example, the frequency resolver 120 may use an FFT algorithm in the art to compute the discrete Fourier transform (DFT) and the inverse of the waveforms. The Fourier transform converts time (or space) to frequency and vice versa. It should be noted that different Fourier transform methods may be used as desired or needed. Additionally, other types of frequency resolving methods may be used, for example, phase-locked loops or heterodyne devices, among others. Moreover, with respect to the frequency resolving, different methods may be used to determine, for example, peak values as described herein, such as thresholding, zero-crossing detection, and/or derivative changes, among others. Thus, the frequency resolver 120 may be configured, for example, as at least one of a frequency separator, FFT device, zero-flow component resolver, a phase locked loop resolver, a zero crossing resolver and/or a frequency-resolved demodulator.

The sensors 114, 116, as well as the frequency resolver 120 are also coupled to a processor 122. For example, the sensors 114, 116 may be operatively coupled to the processor 124 such that the output signals from the sensors 114, 116 are responsive to the flow characteristics in the flow conduit 112 and are input to the processor 122. Thus, the processor 122 is operably coupled to the sensors 114, 116 and the frequency resolver 120 to receive measurement data and frequency resolved (e.g., frequency filtered) data. The processor 122 is configured to determine a flow rate of the fluid flow in the flow conduit 112, wherein the processor 122 may also use the output of the frequency resolver 120 to select a processing method to determine the flow rate in the flow conduit 112.

With respect particularly to the flow sensor assembly 110 that includes the pair of sensors 114, 116, which may be different types of sensing elements as described in more detail herein, each of the sensors 114, 116 is positioned within the flow conduit 112 that has an upstream opening 124 and a downstream opening 126. It should be understood that the terms "upstream" and "downstream" are relative terms that are related to the direction of flow, such as the flow of gas (e.g., air). Thus, in some embodiments, if the direction of flow extends from element 126 to element 124, then element 126 is the upstream opening and element 124 is the downstream element. For ease of description, the upstream side of the flow sensor assembly 110 will be the side closest to the opening 124 and the downstream side of the assembly will be the side closest to the opening 126.

In various embodiments, the flow disturber 118 is positioned within the conduit 112, which in the illustrated embodiment is equidistant between the sensors 114, 116. However, the sensors 114, 116 may be positioned at different distances from the flow disturber 118. In one embodiment, the sensors 114, 116 may be coupled or mounted to a printed circuit board (PCB) or other output interface and/or support member.

In operation, the flow disturber 118 is configured to form turbulence within the flow stream, such as, for example, waves or eddies, or vortices, where the flow is mostly a spinning motion about an axis (e.g., an imaginary axis), which may be straight or curved. Additionally, vortex shedding, for example, occurs as an unsteady oscillating flow that takes place when a fluid such as air flows past a blunt body such as the flow disturber 118 at certain velocities, depending to the size and shape of the body. The flow disturber 118 may be a passive (non-moving) or active device (moving, such as translating or rotating).

Thus, the flow disturber 118 causes the formation of turbulence within the flow conduit 112, such as vortices that travel downstream within the flow conduit 112. This turbulence is measured by the sensors 114, 116 that are responsive to the flow characteristics in the flow conduit 112.

Figure 2:
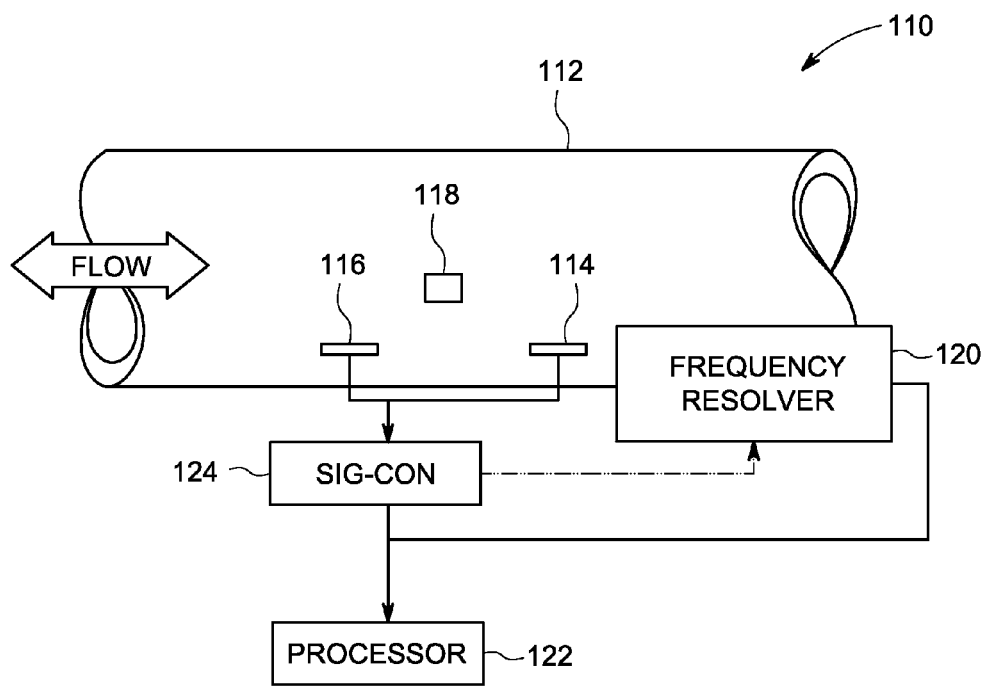
FIG. 2 is a schematic illustration of a flow sensor assembly in accordance with another embodiment.

In various embodiments, the sensors 114, 116 are configured to acquire measurements and send signals to one or more signal conditioners 124 as illustrated in FIG. 2 (showing one signal conditioner 124 coupled to both of the sensors 114, 116). The signal conditioner 124 conditions the signals by, for example, filtering or amplifying the received signals, prior to sending the signals to, for example, anti-aliasing filters, and the processor 122 for analysis. For example, the signals generated by the sensors 114, 116 are communicated to the processor 122 that is configured to determine a flow rate within the flow conduit 112, which may use a cross-correlation of the signals from the sensors 114, 116 and frequency resolved information from the frequency resolver 120.

It should be noted that the shape of the flow disturber 118, the positioning of the flow disturber 118 relative to the sensors 114, 116 and within the conduit 112, and in general the size and positioning of the various components may be varied as desired or needed to generate particular disturbances within the conduit 112 and to allow measurement of the disturbances, such as the frequency and/or phase of the disturbances. For example, one or both of the sensors 114, 116 are positioned a defined distance from the flow disturber 118 to allow detection of the turbulent vortices or pressure/flow pulses caused by the flow disturber 118, in particular, within a distance where the disturbances have been formed, but not decayed to the point of being undetectable. These disturbances can be largely turbulent in nature. Thus, there are regions located at a distance from the flow disturber 118, at which the sensors 114, 116 are positioned and which have a geometrical relationship, wherein the error in the sensor reading is reduced or minimized. In one embodiment, the sensors 114, 116 are located equidistant from the flow disturber 118 as described herein. It should be noted that although only one flow disturber 118 is shown in FIG. 1, two or more flow disturbers 118 may be utilized within the conduit 112.

In operation, the characteristics, such as the vortices or disturbances in the form of pulses, of flow that can be determined are, for example, flow speed, flow direction, the pressure of the flow, the temperature of the flow, the change in velocity of the flow, the change in pressure of the flow, and the heat transfer of the flow. Thus, the sensors 114, 116 can be any type of sensor capable of sensing any one or more of these disturbances. For example, the sensors 114, 116 may be configured to determine pressure, temperature, change in pressure, change in temperature, or change in flow rate. In one embodiment, the sensors 114, 116 are pressure sensors. In another embodiment, the sensors 114, 116 are heaters. In yet another embodiment, the sensors 114, 116 are microelectromechanical (MEMS) devices.

In some embodiments, such as wherein the flow sensor assembly 110 forms part of a CPAP or VPAP machine, a fan (and control motor), not shown, are in fluid connection with the flow conduit 112 to generate a flow of fluid, in this embodiment, air, through the flow conduit 112. A mask (not shown) is in fluid connection with the conduit 112, which may be configured as or form part of a flexible tube that is fluid connection with the fan. The fan is also communicatively coupled to the processor 122 to allow control of the fan. For example, the processor 122 uses signals received from the sensors 114, 116 to control the operation of the fan, such as to vary the level of the speed of the fan or turn the fan on or off, which controls a flow of air to a the mask that may be worn by a person.

It should be noted that variations and modifications are contemplated. For example, different types of sensors 114, 116 may be used. Additionally, different types of flow disturbers 118 may be used, such as passive actuators or active actuators that are configured to impart a disturbance to the flow within the flow conduit 112. For example, the flow disturber 118 may include two parts separated from each other (e.g., each being half-cylindrical in shape) by a flow separator, such as to form a channel or gap therebetween. The first and second parts in one embodiment are blunt flow disturbers. The first and second parts may be separate pieces or may be opposite sides of a single flow disturber that has a flow separator formed in a middle portion thereof. Additionally, the flow disturber 118 may be positioned orthogonal to the fluid flow direction through the flow conduit 112, such as coupled on opposing sides of the flow conduit 112 or is other transverse positions.

In operation, the direction of flow in the flow conduit 112 can be determined based on an amount of flow disruption. In particular, the flow disturber 118 will create, as a result of being in the fluid path, a higher flow downstream than is upstream. Thus, the upstream sensor will measure a lower flow rate than the downstream sensor. It should be noted that the disturbances may be, for example, periodic, aperiodic, random, or otherwise present or generated.

Figure 3:
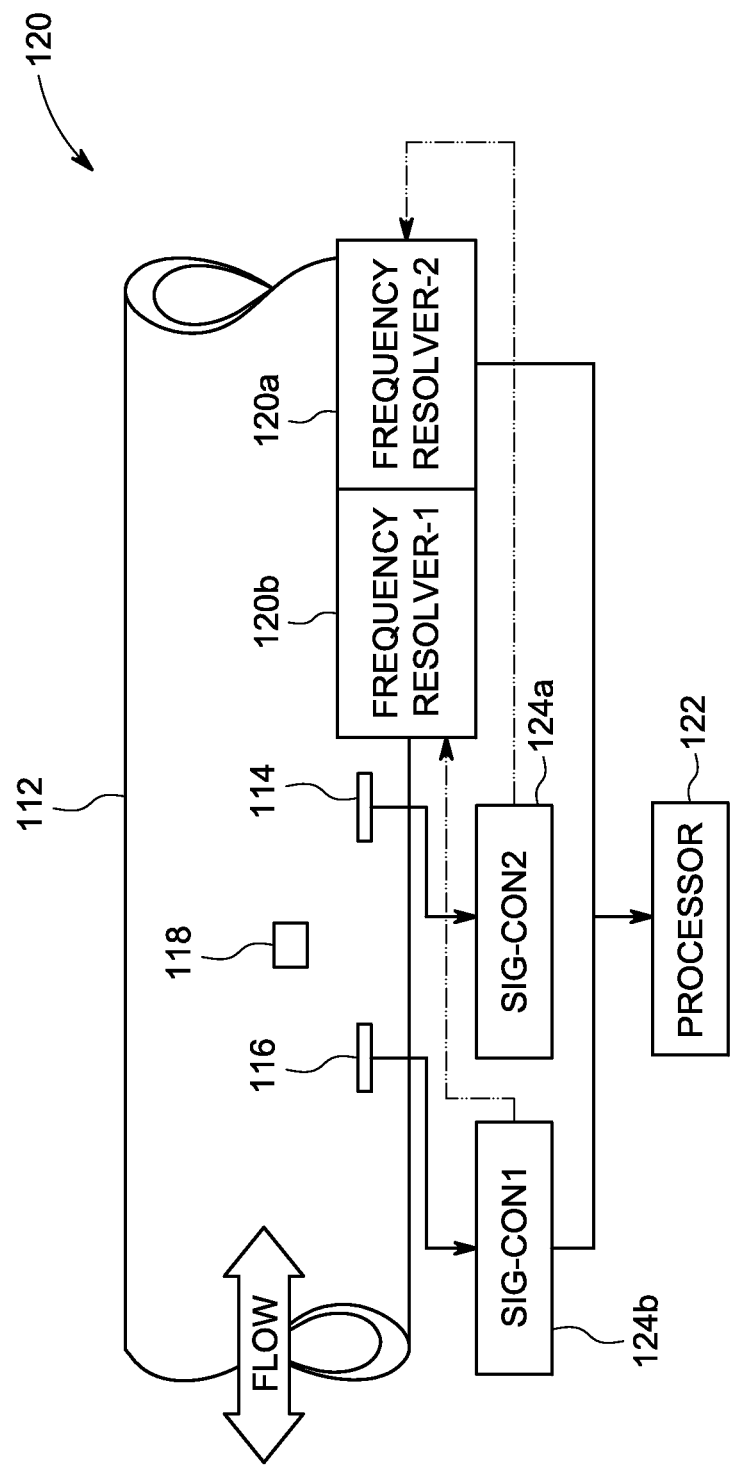
FIG. 3 is a schematic illustration of a flow sensor assembly in accordance with another embodiment.

In some embodiments, separate receiving and/or processing components for receiving the signals from the sensors 114, 116 may be provided. For example, in one embodiment, as shown in FIG. 3, the signal conditioners 124a, 124b are coupled to the sensors 114, 116, respectively, as well as to the processor 122. Further, the frequency resolvers 140a, 140b, are coupled to the signal conditioners 124a, 124b, respectively, as well as to the processor 122. Accordingly, a separate frequency resolving operation may be performed for measurement received from each of the sensors 114, 116. However, in some embodiments, two frequency resolvers 140 may be coupled to each of the sensors 114, 116. As should be appreciated, these and other variations are contemplated herein.

In some embodiments, dual frequency resolving, such as dual-FFT based sensing may be provided as described in more detail below. In various embodiments, for example, a plurality of FFTs, such as two FFTs in parallel may be operated concurrently. Using multiple frequency resolvers 140 (or processing units) allows for defining different time periods for use in performing the Fourier transform frequency analysis. The time periods may be, for example, shifted in time or have different time sampling ranges. In these time periods, the Fourier transform frequency analysis transforms the measured signals over time, defined as a function f(t), into a new function, defined by frequency with units of cycles/s (hertz) or radians per second. The new function is known as the Fourier transform and/or the frequency spectrum of the function f. Thus, the Fourier transform relates the function's time domain to the function's frequency domain. The component frequencies are spread across the frequency spectrum and are represented as peaks in the frequency domain. Thus, using a frequency calculation of the detected vortices at one or more of the sensors 114, 116, such as a FFT calculation, the speed of the flow may be determined, as frequency is related to time (T): 1/T. It should be noted that in vortex shedding, the speed of flow is related to the vortex shedding frequency as follows: St=f*L/V, where St is a Strouhal number, f is the vortex shedding frequency, L is the characteristic length, and V is the fluid velocity.

In various embodiments, the sampling time periods for the frequency resolvers 120 may be different and used, for example, based on a flow rate within the flow conduit 112. In some embodiments, a threshold value may be defined and a particular frequency resolver 120 selected for analyzing the measurement data from the sensors 114, 116 based on the threshold value (e.g., whether the flow rate is lower, higher, or equal to the threshold value). For example, a larger number of samples, such as resulting from a longer sampling time period, results in a better resolution for the Fourier analysis. However, as described herein, it may be preferred or desired to use a shorter time period, such as when the flow rate is high (and the frequency of the detected disturbances within the flow are also correspondingly high). For example, if the frequency is about 1000 Hz, then a 10 Hz resolution may be acceptable. However, if the frequency is 15 Hz, a 10 Hz resolution may perform unsatisfactorily. In various embodiments, as described in more detail herein, at least one of a threshold detector, a cross-calibrator, a mass flow calculator, a FFT module and/or an inverse FFT module may be provided.

In other embodiments, multiple frequency resolvers 120 may be implemented or a single frequency resolver 120 that uses a sliding or moving time sample window (e.g., shifting in time). For example, as data is acquired by the sensors 114, 116 a moving time sampling window may be used that is shifted in time, such as shown in FIG. 4. It should be noted that a frequency resolver 120 may include one or more processors or modules that implement, for example, FFT operations in parallel, such as concurrently as data is acquired. In other embodiments, the processing of the acquired data may be performed at least partially sequentially or entirely sequentially. Thus, different configurations and arrangements of frequency resolvers 140 may be provided. For example, a functional relationship between a plurality of frequency resolvers 140 may be defined, such as plurality of parallel frequency resolvers 140 or a plurality of meshed frequency resolvers 140.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

For example, FIG. 4 illustrates two time sample windows 140 and 142 that may be used by the frequency resolver 120. The processing associated with each of the time sample windows may be performed using one processor or module or multiple processors or modules. In one embodiment, a separate frequency resolver 120 is coupled to each of the sensors 114, 116, which may facilitate operations described herein particularly when the direction of flow within the flow conduit 112 (shown in FIGS. 1-3) is not known. As can be seen, each of the time sample windows 140 and 142 includes a same number of data samples 144 (illustrated as 19 data samples), which may corresponds to different measurements acquired by the sensors 114, 116. For example, the sensors 114, 116 may acquire discrete measurements at defined intervals (e.g., every 10 milliseconds). However, in other embodiments, the sensors 114, 116 may acquire data continuously or substantially continuously, such that the data samples 144 correspond to time periods for the data acquisition (e.g., sub-divided time windows within the larger time sample windows 140 and 142 that correspond to sub-sets of the acquired data).

It should be noted that the data samples 144 may be different types of data and information as described herein and as acquired by the sensors 114, 116. Additionally, it should be noted that the data samples 144*a* are data samples acquired and already processed within a previous time sample window. However, for ease of illustration, only the two time sample windows 140 and 142 are shown. Thus, in various embodiments, some of the data samples 144 may be used in multiple frequency resolving operations, for example, in separate FFT calculations. In other embodiments, the entire time sample window may be shifted such that there is no repetition in the data samples 144 used in the different calculations.

In the illustrated embodiment, the time sample window 140 includes a data sample 144*b* that is not used in the time sample window 142. Instead, as the time windows are shifted, the time sample window 142 includes the data sample 144*c*, which was not included in the time sample window 140. For example, the data sample 144*c* may have been acquired after the time sample window 140 was processed, or exceeded the defined time limit of data samples for the time sample window 140 (which may be varied as desired or needed and as described herein). Thus, the time sample windows 140 and 142 process a same number of data samples 144, but which include one or more different samples 144. As another example, the shift in time of the time sample windows 140 and 142 may result in two, three, or more data samples being included in one of the time sample windows 140 and 142 and not the other time sample windows 140 and 142. Accordingly, in various embodiments, a time shift value may be defined based on an amount of overlap of data samples in the time sample windows 140 and 142 that is desired or needed. It should be noted that the time sample windows 140 and 142 may be different windows or may be the same window that is shifted in time.

The time sample windows 140 and 142 defines or identifies the data that is used by the frequency resolver 120 to perform frequency resolving, such as FFT calculations or analysis as described herein. Accordingly, by varying the amount of data used for the calculations or analysis, the amount of time and resolution or accuracy of the frequency resolving may be changed. For example, as the amount of data used is increased (such as when a longer time sample window is used), the resolution increases, but the time period for the calculations also increases. Thus, a number of factors may be used to select or define the length of the time sample windows 140 and 142, such as a desired or required: resolution, calculation time period, and/or flow rate within the flow conduit 112, among others. Additionally, one or more different processing methods or schemes may be used for determining the flow rate based on these different factors, or a previous output value from the frequency resolver 120. In some embodiments, the processing method, for example, may be based on a plurality of flow regimes as described herein.

Variations and modifications are contemplated. For example, FIG. 5 illustrates the frequency resolver 120 configured to use a plurality of time sample windows 150 and 152 (two are shown for ease of illustration). In this embodiment, the time sample windows 150 and 152 have different lengths such that the time period and/or number of data samples 154 encompassed within each are different. Thus, the length of the time sample windows 150 and 152 is different. In the illustrated embodiment, the data samples 154 within the time sample window 150 are a subset of the data samples 154 within the time sample window 152. For example, in this embodiment, all of the data samples 154 are also within the time sample window 154, which includes additional data samples 154 that were acquired or exist before, after or before and after the data samples 154 within the time sample window 152. It should be noted that the time sample window 150 may positioned at different locations within the time sample window 152. For example, the time sample window 150 may be positioned generally in the middle, at the beginning of, or at the end of the time sample window 152. However, it should be appreciated that the time sample window 150 may be positioned along any portion of the time sample window 152. Additionally, the length of the time sample window 150 may be varied as desired or needed, such as based on the factors described herein and/or the size or length of the time sample window 152. Additionally, the time samples windows 150 and 152 may be shifted in time as more samples are acquired and as discussed in connection with FIG. 4.

In the various embodiments, the time shifting for each of the time sample windows 150 and 152 may different, such that the amount each of the time sample windows 150 and 152 is shifted may be different. However, in various embodiments, the time shift for the time sample windows 150 and 152 may be the same. Additionally, the description above in connection with the time samples windows 150 and 152 is also applicable to the time samples windows 140 and 142.

Moreover, although only a single time sample window 150 is shown within the time sample window 152, multiple time sample windows 150 may be provided within a single time sample window 152. It should be noted that each of the time samples windows 150 and 152 may correspond to or be the input to a single frequency resolver 120, multiple frequency resolvers 120, multiple FFTs or other frequency resolvers, and/or one or more processors, among others. Thus, while the time sample windows illustrated in various embodiments are shown within a single frequency resolver 120, multiple frequency resolvers 120 may receive different inputs. In other embodiments, and for example, the frequency resolver 120 may include a one or more processors, modules, FFTs (or other frequency resolvers). Thus, in some embodiments, the data from different time sample windows may be processed by different processing units or components, such as multiple or plural processors and/or FFTs within the frequency resolver 120.

Additionally, the time period defined by one or more of the time sample windows (e.g., time sample windows 140, 142, 150, 152) and the time shift for the time sample windows may be predetermined or defined (e.g., based on a user input or adjustment from a default value), as well as static or dynamic. For example, once initially set, the size or length of the time sample windows and/or time shift thereof may not change, unless, for example, adjusted by a user. However, in some embodiments, the size or length of the time sample windows and/or time shift thereof may change dynamically, such as based on one or more factors described herein. Thus, the size or length of the time sample windows and/or time shift thereof (as well as other variables) may be adjusted continuously or periodically to optimize or improve the processing (e.g., processing time or resolution) to provide a more robust determination of the flow rate.

Figure 6:
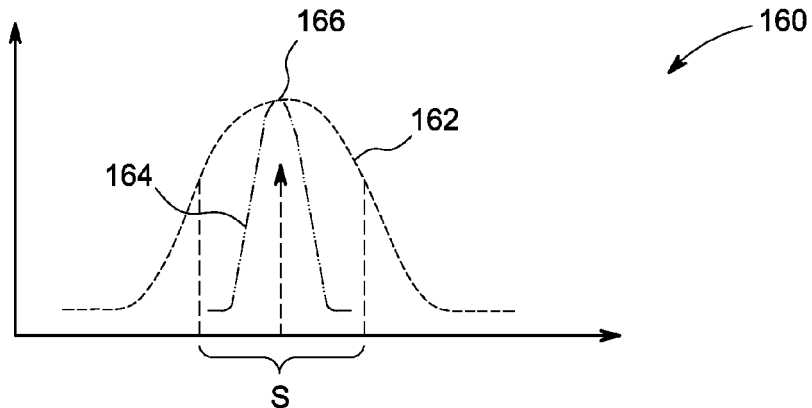
FIG. 6 is a graph illustrating output signals generated using different time sample windows in accordance with various embodiments.

FIG. 6 illustrates a graph 160 of exemplary outputs from the frequency resolver 120, where the horizontal axis corresponds to frequency and the vertical axis corresponds to amplitude (or the horizontal axis corresponds to the reciprocal of time and the vertical axis corresponds to amplitude). In the illustrated example, the curve 162 is the output from the frequency resolver 120 (such as shown in FIG. 5) corresponding to the frequency resolving calculations (e.g., FFT calculations) for the time sample window 150. Additionally, the curve 164 is the output from the frequency resolver 120 corresponding to the frequency resolving calculations (e.g., FFT calculations) for the time sample window 152. As discussed herein in more detail, the number of data samples 154 (or overall amount of data) processed within each of the time sample windows 150, 152 is different. As can be seen, using the data samples 154 within the shooter time sample window 150 a coarser frequency resolving calculation may be performed, resulting in the curve 162 being wider than the curve 164 (such that a coarser resolution is provided). However, because less data samples 154 are processed, the frequency resolving calculation time is faster than the frequency resolving calculation time for the data samples 154 in the time sample window 152.

As further can be seen, the curve 164 is narrower providing a finer resolution as illustrated by the narrower curve. However, the time to determine the curve 164 is longer than the curve 162 because more samples are processed as part of the frequency resolving calculation (assuming the same flow rate). In various embodiments, a combination approach is used to obtain or preserve a good response time, as well as a good resolution. For example, the size or length of the time sample windows 150 and 152 may be adjusted to encompass a number of data samples 154 or range of data samples 154 (e.g., based on a variable rate of the flow within the flow conduit 112) to adjust the response time and/or resolution as desired or needed.

In one embodiment, an initial frequency resolving calculation is performed using the time sample window 150 to determine a coarse position of a peak 166 corresponding to the frequency for the frequency resolving calculation. For example, in some embodiments, using the reduced set of data samples 154 in the shorter time sample window 150, a subsequent search range (S) may be determined for a finer frequency resolving calculation using additional data samples 154 within the time sample window 152. Thus, the output from an initial frequency resolving calculation performed using the time sample window 150 may be leveraged to reduce the search range for determining the peak 166 using the data samples 154 within the time sample window 152 (which also includes some or all of the data samples 154 from the time sample window 150). For example, the frequency resolving calculation may be performed in a shorter time period, but maintaining a resolution similar to using the data samples 152 in the longer time period of the time sample window 152.

In various embodiments, using the coarser frequency resolving calculation, an approximate location of the peak 166 may be determined, such as within the search range (S). It should be noted that the range for the approximate location of the peak 166 may be varied, such as based on the different factors described herein, as well as, for example, the number of data samples in each of the time sample windows 150, 152. In some embodiments, the data samples 154 outside of the search range (S) are padded, for example, set to zero values. Thus, in various embodiments, improved or increased resolution in a same or shorter time period may be provided. Accordingly, in this embodiment, a meshed type of frequency resolver may be provided instead of a parallel type of frequency resolver as described herein (e.g., using samples from shifted time sample windows and not combined or leveraged).

In some embodiments, only one of the time sample windows 150, 152 may be selected or used. For example, if the frequency is high, such as when a higher flow rate exists in the flow conduit 112, a shorter frequency resolver may be used for performing FFT calculations using a shorter time sample window that includes a larger number of data samples 154 when the flow within the flow conduit 112 is faster. If the flow rate within the flow conduit 112 slows or is slower, then a longer time sample window, such as the time sample window 152 may be used. However, it should be appreciated that the selection of whether to use one or more of the time sample windows, and whether to perform, parallel, sequential and/or meshed frequency resolving calculations, may be determined based on various factors as described herein, and/or as desired or needed. Thus, in some embodiments, the frequency resolver 120 may comprise or provide at least one of meshed short-sample FFT and long-sample FFT based sensing.

The output of the frequency resolver 120 may then be used to determine the flow rate within the flow conduit 112 as the frequency of the disturbances is related to the flow rate.

Additionally, measurements from different flow regimes may be used for calibrations. In some embodiments, different flow thresholds may be selected based on when vortices are formed within the flow conduit 112 and calculations performed, such that an overlap region may be used to interpolate a linear relationship in the different regimes by using amplitude characteristics of the measured signals. This information may be used to calibrate the sensors below the threshold where vortices are not formed such that the flow rate may be calculated using calibrated flow information, such as described in co-pending patent application Ser. No. 13/247,107 filed on Sep. 28, 2011, entitled "FLOW SENSOR WITH MEMS SENSING DEVICE AND METHOD FOR USING SAME". However, it should be noted that other suitable methods, such as known in the art, may be used to calculate the flow rate from the determined frequency, such as based on the identified peak 166 shown in FIG. 6. In some embodiments, for example, the frequency resolver 120 is configured with at least one of amplitude aided biasing or amplitude and frequency aided biasing.

Methods for determining a flow rate through a flow conduit are also provided. The methods, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the methods may be able to be used as one or more algorithms to direct hardware to perform operations described herein.

Figure 7:
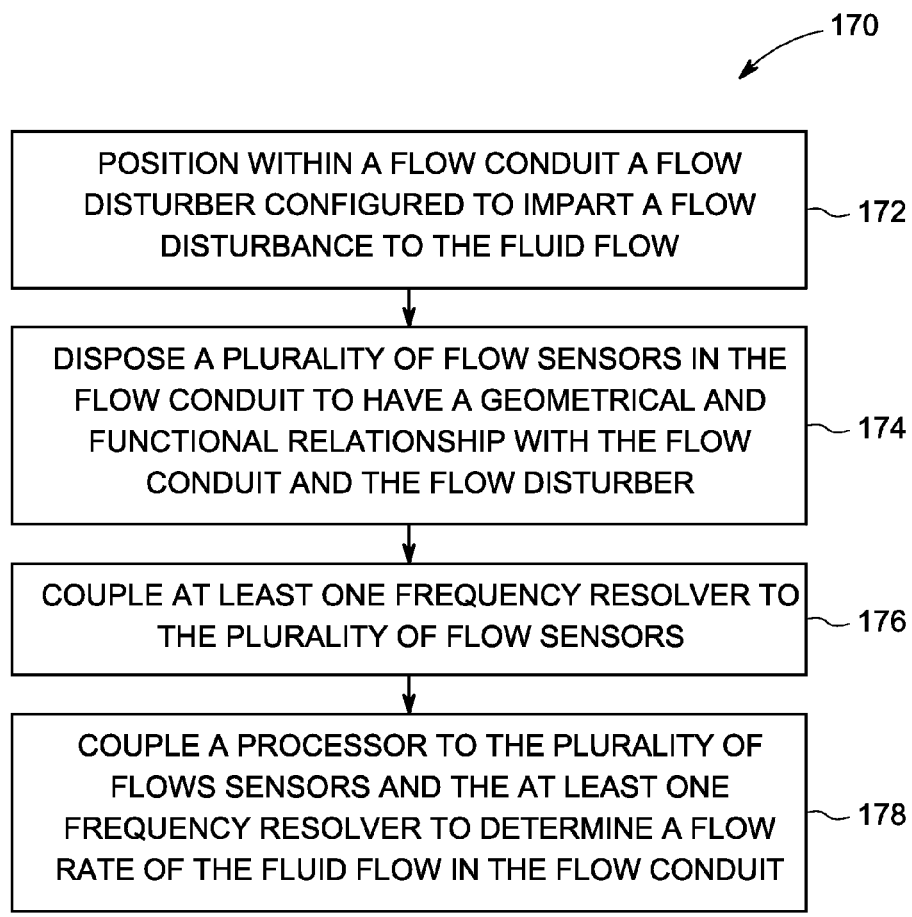
FIG. 7 is a flowchart of a method in accordance with an embodiment.

A method 170 as shown in FIG. 7 includes positioning within a flow conduit a flow disturber configured to impart a flow disturbance to the fluid flow at 172. For example, the flow disturber 118 may be positioned within the flow conduit 112 as described herein. The method 170 also includes at 174 disposing a plurality of flow sensors in the flow conduit to have a geometrical and functional relationship with the flow conduit and the flow disturber as described herein, wherein the plurality of flow sensors are responsive to flow characteristics in the flow conduit. The flow sensors may be, for example, the sensors 114, 116. The method additionally includes at 176 coupling at least one frequency resolver (e.g., the frequency resolver 120) to the plurality of flow sensors, wherein the one or more frequency resolvers are configured to generate an output signal based on at least one of the flow characteristics, which may include, for example, an FFT peak frequency determination as described in more detail herein. Additionally, as described in more detail herein, one or more time sample windows are used to select the data samples for use in one or more frequency resolving calculations.

The method 170 also includes at 178 coupling a processor to the plurality of flows sensors. The processor may be the processor 122 that is configured to determine a flow rate of the fluid flow in the flow conduit and optionally use the output signal from the frequency resolver to select a processing method for determining the flow rate in the flow conduit as described herein. The processing may include using frequency resolving calculation outputs that are generated from parallel, sequential and/or meshed operations.

Figure 8:
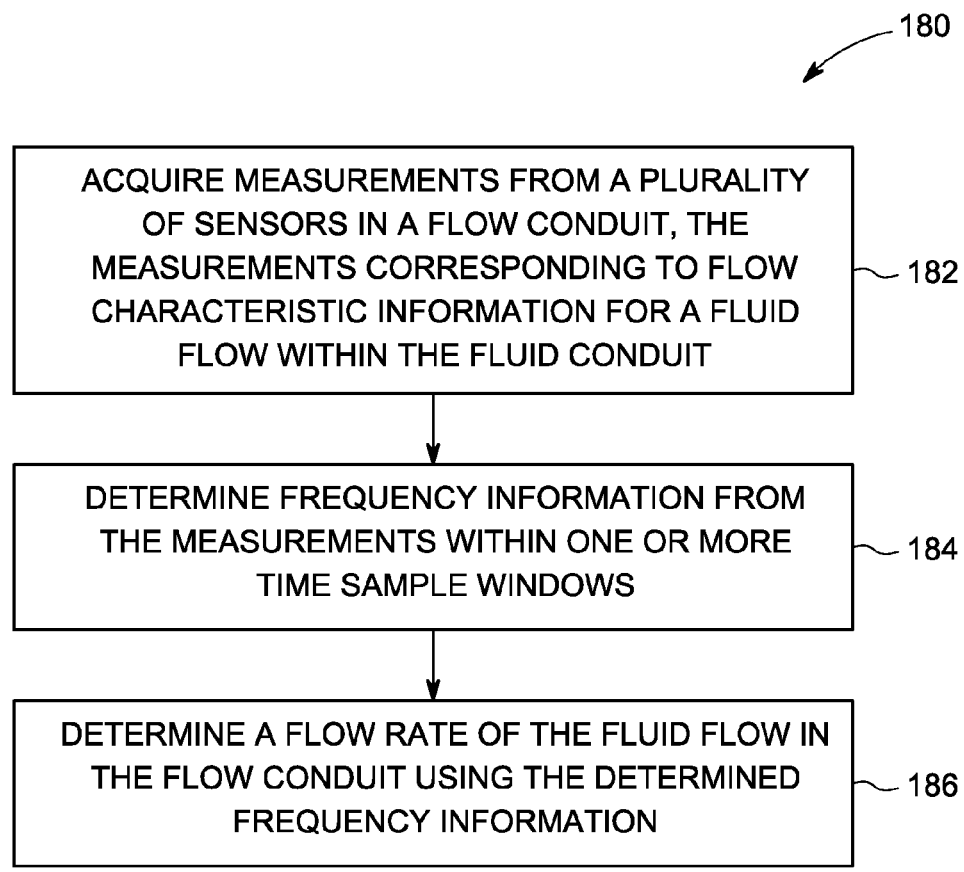
FIG. 8 is a flowchart of a method in accordance with another embodiment.

In another method 180 shown in FIG. 8, measurements from a plurality of sensors in a flow conduit are acquired at 182, such as the sensors 114, 116. The measurements may correspond to flow characteristic information for a fluid flow within the flow conduit as described herein (that includes disturbances from a flow disturber). The method 180 also includes at 184 determining frequency information from the measurements within one or more time sample windows. For example, different size or lengths of time sample windows may be used, which may be processed using different methods as described herein. The method 180 additionally includes at 186 determining a flow rate of the fluid flow in the flow conduit using the determined frequency information, which may be performed by the processor 122. It should be noted that one or more time sample windows may have a length based at least in part on one or more flow characteristics, such as the rate of flow. It also should be noted that the rate of flow may be derived from the frequency of the flow disturbance in some embodiments and/or the amplitude of the flow disturbance in some embodiments. Additionally, various embodiments may use the frequency information and/or amplitude information to select a processing method for determining the flow rate in the flow conduit as described in more detail herein.

Thus, various embodiments use flow sensors, such as in a flow sensor assembly for flow sensing using frequency information from one or more time sample windows.

It should be noted that the various embodiments may be implemented in hardware, software or a combination thereof.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and/or non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A flow sensor assembly comprising:
a flow conduit configured to allow fluid flow therethrough;
a flow disturber disposed in the flow conduit, the flow disturber configured to impart a flow disturbance to the fluid flow;
a plurality of flow sensors disposed in the flow conduit, the plurality of flow sensors being responsive to flow characteristics in the flow conduit;
a frequency resolver coupled to the plurality of flow sensors, the frequency resolver configured to determine frequency information related to the fluid flow based on the flow characteristics, the frequency resolver using one or more time sample windows to select data samples from the plurality of flow sensors for use in determining the frequency information, a length of one or more of the time sample windows based at least in part on the flow characteristics; and
a processor coupled to the plurality of flows sensors and the frequency resolver, the processor configured to determine a flow rate of the fluid flow in the flow conduit using the frequency information.

2. The flow sensor assembly of claim 1, wherein the processor is further configured to use the frequency information to select a processing method for determining the flow rate in the flow conduit.

3. The flow sensor assembly of claim 1, wherein the processor is further configured to use amplitude information to select a processing method for determining the flow rate in the flow conduit.

4. The flow sensor assembly of claim 1, wherein the frequency resolver comprises at least one of a frequency separator, a fast Fourier transform (FFT) device, a zero-flow component resolver, a phase locked loop resolver, a zero crossing resolver and/or a frequency-resolved demodulator.

5. The flow sensor assembly of claim 1, wherein the frequency resolver is configured with at least one of amplitude aided biasing or amplitude and frequency aided biasing.

6. The flow sensor assembly of claim 1, wherein the frequency resolver is configured to perform at least one of meshed short-sample fast Fourier transform (FFT) and long-sample FFT based sensing.

7. The flow sensor assembly of claim 1, further comprising a plurality of frequency resolvers and a plurality of time sample windows, wherein at least one of the plurality of time sample windows has a different time period than at least one other of the plurality of time sample windows.

8. The flow sensor assembly of claim 1, further comprising a plurality of time sample windows, and the frequency resolver is configured to use one of the plurality of time sample windows for a coarse frequency resolving calculation and a different one of the plurality of time sample windows for a fine frequency resolving calculation to determine the frequency information.

9. The flow sensor assembly of claim 1, further comprising a plurality of time sample windows, and the frequency resolver is configured to use different ones of the plurality of time sample windows shifted in time for a frequency resolving calculation to determine the frequency information.

10. The flow sensor assembly of claim 1, wherein the frequency resolver comprises at least one of a threshold detector, a cross-calibrator, a mass flow calculator, a fast Fourier transform (FFT) module or an inverse FFT module.

11. The flow sensor assembly of claim 1, wherein the plurality of sensors are disposed in the flow conduit having at least one of a geometrical relationship or a functional relationship with the flow conduit and the flow disturber, and further comprising a plurality of frequency resolvers providing one of a parallel or meshed functional relationship.

12. The flow sensor assembly of claim 1, wherein the plurality of flow sensors comprises at least one of microelectromechanical (MEMS) sensors, pressure sensors or heaters.

13. A method for determining flow rate in a conduit, the method comprising:
positioning within a flow conduit a flow disturber configured to impart a flow disturbance to the fluid flow;
disposing a plurality of flow sensors in the flow conduit, the plurality of flow sensors being responsive to flow characteristics in the flow conduit;
coupling at least one frequency resolver to the plurality of flow sensors, the frequency resolver using one or more time sample windows to select data samples from the plurality of flow sensors for use in determining frequency information, a length of one or more time sample windows based at least in part on the flow characteristics; and
coupling a processor to the plurality of flows sensors and the frequency resolver, the processor configured to determine a flow rate of the fluid flow in the flow conduit using the frequency information.

14. The method of claim 13, further comprising coupling to the plurality of flow sensors the frequency resolver that comprises at least one of a frequency separator, a fast Fourier transform (FFT) device, a zero-flow component resolver, a phase locked loop resolver, a zero crossing resolver or a frequency-resolved demodulator.

15. The method of claim 13, further comprising coupling to the plurality of flow sensors the frequency resolver that is configured to perform at least one of meshed short-sample fast Fourier transform (FFT) and long-sample FFT based sensing.

16. The method of claim 13, further comprising coupling a plurality of frequency resolvers to the plurality of flow sensors and also comprising a plurality of time sample windows, wherein at least one of the plurality of time sample windows has a different time period than at least one other of the plurality of time sample windows.

17. The method of claim 13, further comprising coupling to the plurality of flow sensors the frequency resolver that is configured to use one of a plurality of time sample windows for a coarse frequency resolving calculation and a different one of the plurality of time sample windows for a fine frequency resolving calculation to determine the frequency information.

18. The method of claim 13, further comprising coupling to the plurality of flow sensors the frequency resolver that is configured to use different ones of a plurality of time sample windows shifted in time for a frequency resolving calculation to determine the frequency information.

19. A method for determining flow rate in a conduit, the method comprising:
acquiring measurements from a plurality of flow sensors in a flow conduit having disturbances imparted therein, the measurements corresponding to flow characteristic information;
determining frequency information from the measurements within one or more time sample windows, the one or more time sample windows defining a plurality of data samples from the plurality of flow sensors for use in determining the frequency information, a length of one or more time sample windows based at least in part on the flow characteristics; and
determining a flow rate of the fluid flow in the flow conduit using the determined frequency information.

20. The method of claim 19, wherein determining the frequency information comprises performing at least one of meshed short-sample fast Fourier transform (FFT) and long-sample FFT based sensing.

21. The method of claim 19, wherein determining the frequency information comprises using one of a plurality of time sample windows for a coarse frequency resolving calculation and a different one of the plurality of time sample windows for a fine frequency resolving calculation to determine the frequency information.

* * * * *